(12) United States Patent
Meyer et al.

(10) Patent No.: US 6,345,840 B1
(45) Date of Patent: Feb. 12, 2002

(54) VEHICLE SEAT HAVING A SEAT FACE ELEMENT AND ADJUSTABLE BACKREST ELEMENT

(75) Inventors: Michael Meyer, Altdorf; Frank Schink, Grosselfingen; Manfred Muller, Deizisau, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/501,551

(22) Filed: Feb. 9, 2000

(30) Foreign Application Priority Data

Feb. 10, 1999 (DE) .......................... 199 05 363

(51) Int. Cl.[7] ............................................. B60R 21/32
(52) U.S. Cl. ............................................... 280/735
(58) Field of Search ................. 280/734, 735; 180/273; 297/250.1, 216.1, 216.13; 340/666, 667

(56) References Cited

U.S. PATENT DOCUMENTS 5,161,820 A * 11/1992 Vollmet ...................... 280/730
5,232,243 A * 8/1993 Blackburn et al. .......... 280/732
5,573,269 A * 11/1996 Gentry et al. ............... 280/735
5,618,056 A 4/1997 Schoos et al.
5,683,103 A * 11/1997 Blackburn et al. .......... 280/735

FOREIGN PATENT DOCUMENTS

DE       4237072 C1    2/1993
DE       4409971 C2    1/1996

* cited by examiner

*Primary Examiner*—Paul N. Dickson
*Assistant Examiner*—Faye M. Fleming
(74) *Attorney, Agent, or Firm*—Crowell & Moring LLP

(57) ABSTRACT

Vehicle seat having a seat face element and adjustable backrest element. A vehicle seat having a seat face element with a pressure-sensitive seat occupation sensor system, and having a backrest element which can be adjusted between a backrest function position and a lowered position resting on the seat face element. A backrest position sensor system is provided which detects whether the backrest element assumes the lowered position, and in this case outputs a lowered position information item.

14 Claims, 1 Drawing Sheet

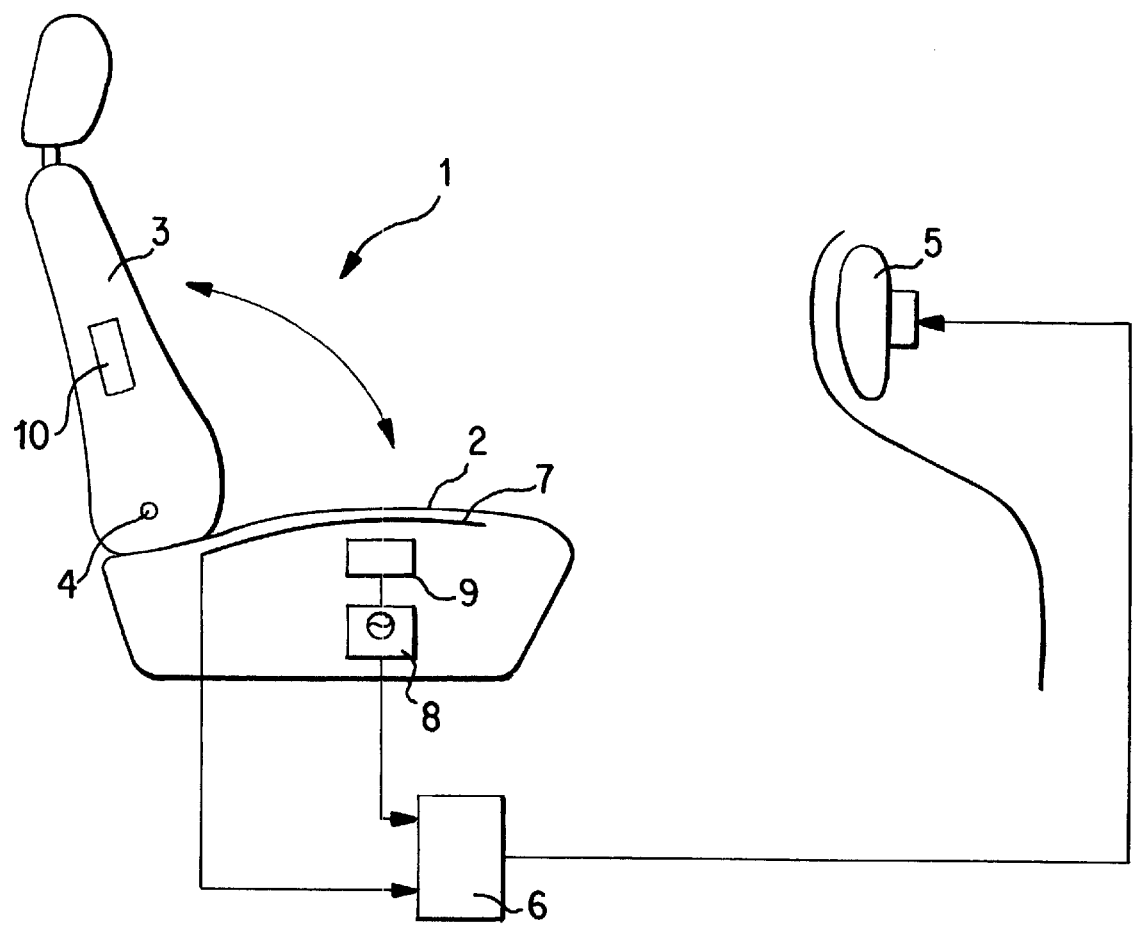

VEHICLE SEAT HAVING A SEAT FACE ELEMENT AND ADJUSTABLE BACKREST ELEMENT

The invention relates to a vehicle seat having a seat face element, in particular such an element which is equipped with a pressure-sensitive seat occupation sensor system, and a backrest element which can be adjusted between a backrest function position and a lowered position resting on the seat face element.

DE 42 37 072 C1 discloses a vehicle seat having a seat face element which is equipped with a pressure-sensitive seat occupation sensor system in the form of a resistive membrane-type pressure sensor. If the seat face element is loaded, the electrical resistance of the membrane-type pressure sensor which is contained within it changes, and a seat occupation information item is made available and can be fed, for example, to an airbag activation system.

DE 44 09 971 C2 discloses a vehicle seat with a seat occupation sensor system for a seat face element of said seat, which sensor system is capable of detecting the effects of pressure on the seat face element and additionally then deciding whether or not said effects are caused by a child's seat which has been positioned on said seat. In addition to a pressure sensor element, this vehicle seat has, for this purpose, a base antenna in the seat face element, which base antenna emits an electromagnetic measuring field. The child's seat is provided with an identification carrier which, within a certain range, brings about a characteristic change, for example attenuation, of the measuring field emitted by the base antenna. In order to sense such a change, the base antenna is assigned an evaluation unit. The evaluation unit can be connected, for example, to an airbag control unit in order to make the airbag control dependent on the occupation of the vehicle seat by a child's seat.

A seat occupation sensor system for a vehicle seat which is specifically capable of detecting when a child's seat is positioned on said seat is also described in U.S. Pat. No. 5,618,056. Here, apart from a pressure sensor element in the seat face element, two electromagnetic coils with an associated electronic evaluation circuit are provided. The electromagnetic coupling between the coils is determined by means of the evaluation circuit, the one coil of which functioning as a transmit coil and the other as a receiver coil. In order to detect a child's seat and possibly its installation direction, said seat has one or more electromagnetic resonators. If the child's seat is installed on the vehicle seat, the resonator modulates the electromagnetic coupling between the coils in the seat face element. The evaluation circuit is capable of sensing this modulation. Not only a seat occupation information item but also a child's seat detection information item can thus be fed to a connected airbag activation system.

In vehicle seats having a backrest element which can be folded over into a lowered position resting on a seat face element in order, for example, to be used as a table, the problem arises that when the backrest element is folded over into the lowered position a seat occupation sensor which is contained in the seat can be loaded and it may then possibly feed an incorrect seat occupation signal to an airbag activation system.

SUMMARY OF INVENTION

The object of the invention is to provide a vehicle seat of the type mentioned at the beginning in which it can automatically be detected in a reliable way whether the backrest element is in its lowered position, and in which as a result no malfunctions occur, such as an undesired activation of an airbag as a result of the triggering of a seat occupation sensor system.

This object is achieved by means of a vehicle seat in which a backrest position sensor system is provided which detects whether the backrest element assumes the lowered position, and in this case outputs a lowered position information item. This lowered position information item can then be taken into account in a suitable way by connected functional units.

In this way it is possible, for example, to avoid unnecessary activation of active restraining means of a vehicle occupant restraining system in a vehicle seat.

In a further development of the invention, the backrest position sensor system is formed by a transponder arrangement with specific encoding and range. In this way, a backrest element position sensor system is created which is easy to mount and at the same time reliable and comfortable.

BRIEF DESCRIPTION OF THE DRAWING

An advantageous exemplary embodiment of the invention is illustrated in the drawing and described below.

FIG. 1 shows a schematic side view of a vehicle seat area.

DETAILED DESCRIPTION

A vehicle seat 1 which is shown in the figure has a seat component 2 as seat face element and a backrest component 3 as backrest element. The backrest component 3 can be adjusted in a pivoting fashion about an axis 4 between an upright backrest function position and a lowered position resting on the seat component 2 as indicated by a double arrow. The vehicle seat 1 is assigned an airbag 5 which is actuated by means of an activation control unit 6. The seat component 2 of the vehicle seat 1 contains a seat occupation sensor system with a conventional, planar pressure sensor 7 such as a membrane-type pressure sensor. The activation control unit 6 continuously senses the resistance of the seat occupation sensor 7. As long as the vehicle seat 1 is not loaded by a vehicle occupant sitting on it, the activation control unit 6 suppresses unnecessary activation of the airbag 5.

In addition, a base station 8, by means of which a transponder detection unit 9 is controlled, is arranged in the vehicle seat 1. In the backrest component 3 of the vehicle seat 1 there is an identification carrier 10 which is embodied as a transponder. The transponder detection unit 9 and identification carrier 10 are of any desired conventional type with a suitable, limited short-range detection capability. The transponder 10 is individually encoded so that it can be detected specifically by the detection unit 9. The detection range is selected to fulfil the required detection function in such a way that the transponder detection unit 9 detects the transponder 10 if the backrest component 3 assumes its lowered position resting on the seat component 2, but not if the backrest component 3 is pivoted away from the seat component 2 and is in one of its backrest function positions which can be selected in an incremental or infinitely variable fashion.

For as long as the backrest component 3 is in one of its backrest positions, the transponder 10 is consequently not detected by the detection unit 9, with the result that the latter does not affect the functioning of the activation control unit 6. When the backrest component 3 is folded over onto the seat component 2, the identification carrier 10 moves, on the other hand, into the vicinity of the transponder detection unit 9. It is then in the short range of the detection unit 9 in which detection is possible, and is thus detected by the latter. As a result, an item of information indicating that the backrest component is folded over is fed to the activation control unit 6 via the base station 8, as a response to which unnecessary airbag activation is suppressed. If, therefore, the seat occupation sensor 7 is loaded by the folded-over backrest component 3, the activation control unit 6 inhibits unnecessary activation of the airbag 5 in an impact situation which would otherwise lead to the activation of the airbag.

In one advantageous embodiment, components of the backrest position sensor system, in particular the transponder detection unit (9) or the base station (8) are formed by components of a child's seat detection sensor system, such as is described, for example, in DE 44 09 971 C2 or U.S. Pat. No. 5,618,056. In such a child's seat detection system, the positioning of a child's seat on the seat face element is detected by interrogating a transponder integrated into the child's seat. The same interrogation device which is integrated into the front seat passenger's seat can then be used to detect both the presence of a child's seat and the lowered position of the backrest element 8.

As an alternative to sensing the folding over of the backrest component 3 of a vehicle seat 1 by means of the transponder arrangement above, any desired other conventional proximity sensor which detects when the backrest component 3 approaches the seat component 2 when folding over occurs may be provided in the vehicle seat to sense the folding over of the backrest component 3.

In addition, it is possible to provide a mechanical or electrooptical or other conventional switch at the pivot axis 4 in order to sense the folding over of the backrest component 3 into its lowered position, which switch switches when a specific tilt angle of the backrest component 3 is exceeded and as a result outputs an appropriate lowered position information item to the activation control unit 6.

Of course, in addition to or instead of the effect on an airbag activation function described above, the detection of the lowered position of the backrest element can, according to the invention, also be used to affect other seat-occupation-specific control functions, for example of heating or air-conditioning settings which are performed as a function of the occupation of seats.

What is claimed is:

1. In a vehicle seat having a seat face element with a pressure-sensitive seat occupation sensor system, and a backrest element which can be adjusted between a backrest function and a lowered position resting on the seat face element, an improvement comprising, a backrest position sensor system is provided which detects whether the backrest element assumes the lowered position and outputs a lowered position information item.

2. The improvement according to claim 1, wherein the vehicle seat is assigned a vehicle occupant restraining system which is controlled as a function of an output signal of the seat occupation sensor system, is connected to the backrest position sensor system and is kept deactivated if the lowered position information item from said backrest position sensor system is received.

3. The improvement according to claim 1, wherein the backrest position sensor system contains a specifically encoded transponder and a transponder detection unit which is capable of communicating with the transponder within a predefined effective range, one of the transponder and the transponder detection unit being located in the backrest element and the other of the transponder and the transponder detection unit being located in or on the seat face element in such a way that the transponder detection unit detects the transponder from encoding of the transponder when the backrest element is in the lowered position and outputs the lowered position information item.

4. The improvement according to claim 3, wherein components of the backrest position sensor system, are formed by components of a child's seat detection sensor system.

5. The improvement according to claim 2, wherein the backrest position sensor system contains a specifically encoded transponder and a transponder detection unit which is capable of communicating with the transponder within a predefined effective range, one component of the transponder and the transponder detection unit being located in the backrest element and the other of the transponder and the transponder detection unit being located in or on the seat face element in such a way that the transponder detection unit detects the transponder from its encoding of the transponder precisely when the backrest element is in its lowered position, and in this case outputs the lowered position information item.

6. A vehicle seat, comprising:

a seat face element, a backrest element which is adjustable between a backrest function position and a lowered position resting on the seat face element, and a backrest position sensor system which detects the backrest element in the lowered position and outputs a lowered position information signal.

7. The vehicle seat according to claim 6, wherein the vehicle seat is assigned a vehicle occupant restraining system which is controlled by an output signal of a seat occupation sensor system and is operatively connected to the backrest position sensor system, and wherein the vehicle occupant restraining system remains deactivated when the lowered position information signal is received by the vehicle occupant restraining system.

8. The vehicle seat according to claim 6, wherein the backrest position sensor system includes an encoded transponder and a transponder detection unit which operatively communicates with the transponder within a predefined effective range.

9. The vehicle seat according to claim 8, wherein a component of one of the transponder and the transponder detection unit is arranged in the backrest element and a component of the other one of the transponder and the transponder detection unit is arranged in or on the seat face element thereby the transponder detection unit detects the transponder when the backrest element is in the lowered position and the lowered position information signal is outputted.

10. The vehicle seat according to claim 9, wherein at least one component of the backrest position sensor system is formed by at least one component of a child's seat detection sensor system.

11. The vehicle seat according to claim 10, wherein the at least one component of the backrest position sensor system includes one of the transponder detection unit and a base station.

12. A method of making a vehicle seat assembly, comprising;

providing a seat face element of a vehicle seat with a pressure-sensitive seat occupation sensor system, arranging a backrest element in relation to the seat face element so that the backrest element is operatively adjustable between a backrest function position and a lowered position resting on the seat face element, and arranging a backrest position sensor system to operatively detect the backrest element in the lowered position and output a lowered position information item.

13. A method according to claim 12, wherein the vehicle seat assembly includes a vehicle occupant restraining system which is controllable by way of an output signal from the seat occupation sensor system and is operatively connected to the backrest position sensor system whereby the vehicle occupant restraining system is kept deactivated by way of the lowered position information item.

14. A method of operating a vehicle occupant restraining system which is assigned to a vehicle seat having a seat face element and a backrest element which is adjustable between a backrest function position and a lowered position resting on the seat face element, comprising;

adjusting the backrest element into the lowered position resting on the seat face element, detecting the backrest element in the lowered position by way of a backrest position sensor system, outputting a lowered position information item by way of the backrest position sensor system, maintaining the vehicle occupant restraining system deactivated upon the vehicle occupant restraining system receiving the lowered position information item.

* * * * *